United States Patent [19]

Krysiak

[11] 4,251,201
[45] Feb. 17, 1981

[54] EXTRUSION APPARATUS

[76] Inventor: Janusz D. Krysiak, 5058 N. Ridgeway, Chicago, Ill. 60625

[21] Appl. No.: 943,181

[22] Filed: Sep. 18, 1978

[51] Int. Cl.$^3$ .............................................. A21C 3/00
[52] U.S. Cl. .................................. 425/132; 264/142; 425/133.1; 425/309; 425/311
[58] Field of Search ............. 425/312, 205, 206, 311, 425/309, 132, 133.1; 264/167, 148, 142

[56] References Cited

U.S. PATENT DOCUMENTS

| 2,578,229 | 12/1951 | Clement et al. | 425/466 |
| 2,712,693 | 7/1955 | Comparette | 425/10 |
| 3,134,832 | 5/1964 | Smith | 264/167 |
| 3,160,493 | 12/1964 | Kappers | 264/148 |
| 3,679,338 | 7/1972 | Lutz | 425/133.1 |
| 3,945,785 | 3/1976 | Belshaw et al. | 425/133.1 |
| 4,015,518 | 4/1977 | Roth et al. | 222/482 |
| 4,155,973 | 5/1979 | Klein | 264/291 |

FOREIGN PATENT DOCUMENTS 1591551 6/1970 France ................................. 425/205

Primary Examiner—Jay H. Woo
Attorney, Agent, or Firm—Merriam, Marshall & Bicknell

[57] ABSTRACT

Extrusion apparatus for production of a shaped article comprising one or more filling materials enclosed in a coating material. Included in the apparatus are inner and outer conduits through which the materials are extruded toward an iris valve adjacent the terminal portion of the outer conduit. An inner conduit preferably terminates within the outer conduit at a distance from the iris valve equal to the distance between outer surface of the inner conduit and inner surface of the outer conduit. Operation of the iris valve both determines the length of the article and the shape of forward and rearward ends of the article.

7 Claims, 17 Drawing Figures

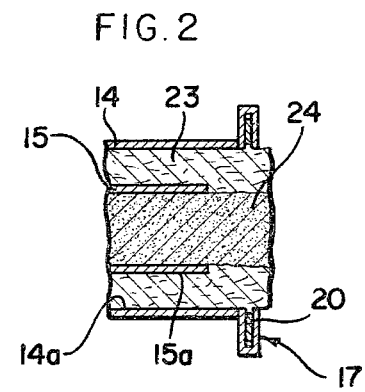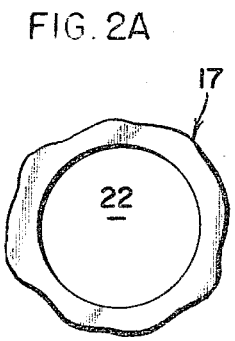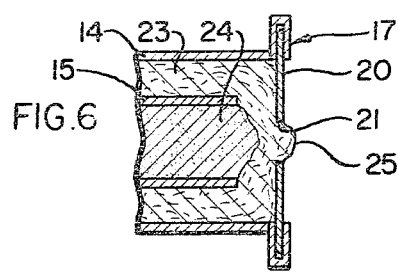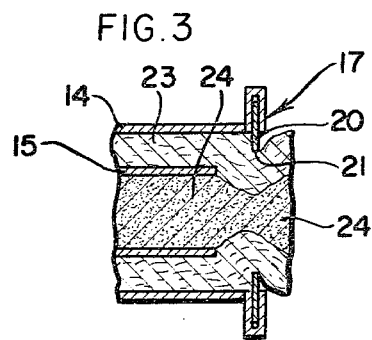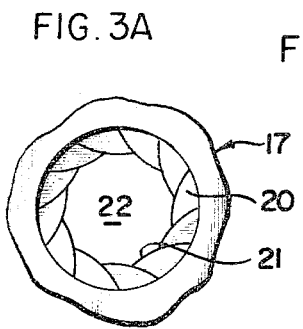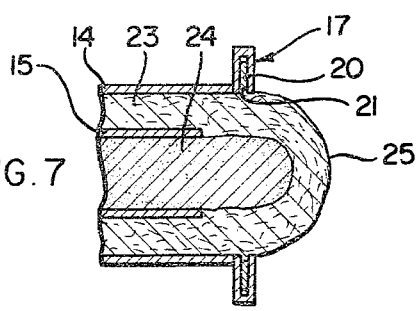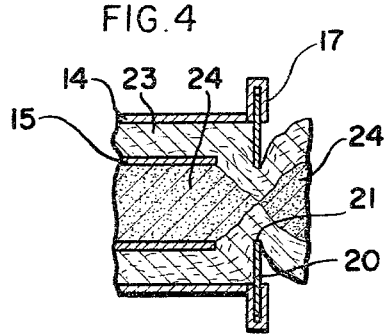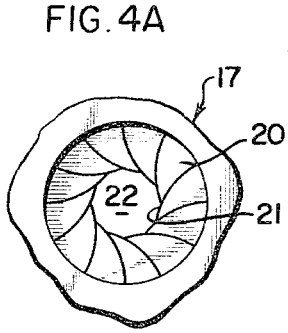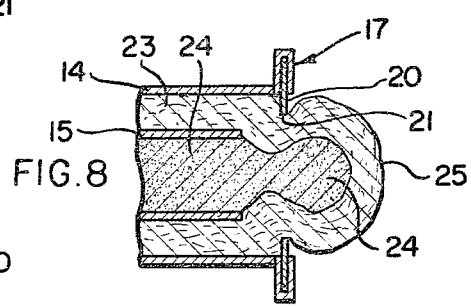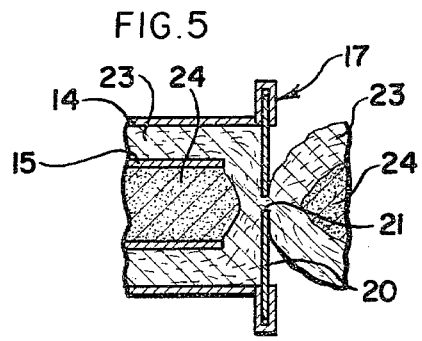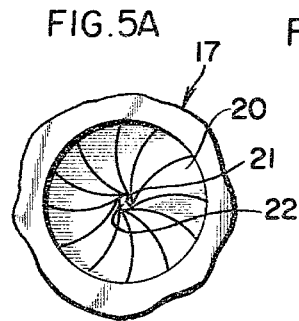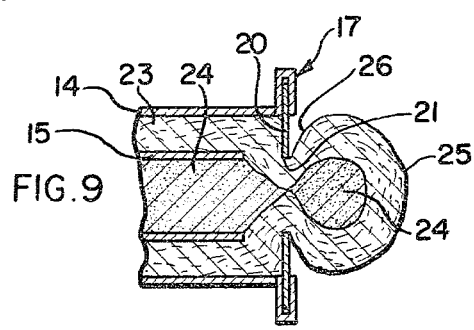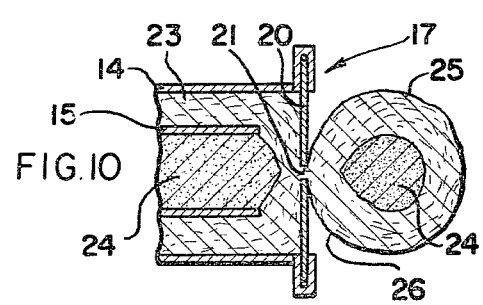

EXTRUSION APPARATUS

BACKGROUND OF THE INVENTION

1. Field of the Invention

This invention relates generally to preparation of shaped articles, such as food products, medicaments and the like, which comprise one or more ingestible substances enclosed in another ingestible substance. More particularly, this invention relates to extrusion apparatus for producing such shaped articles.

2. Prior Art

Products having a central filling material partially or wholly enclosed in an outer layer of a different material (e.g., food products and medicaments) are well known in the art. Examples of such products include tamales, ravioli, dumplings, pierogi, filled donuts, gelatin-coated pharmaceuticals, "soft-center" candies, and the like. Numerous devices have been developed in an attempt to facilitate the rapid production of such articles in large quantities. In general, such devices have included: (1) source means for supplying the inner and outer materials which are, at least initially, in a moldable or extrudable form; (2) means, generally in the form of concentric nozzle elements, for selectively continuously extruding and shaping the materials; and, (3) means for separating the shaped articles from the mass of materials supplied through the extruding means.

Typical examples of such devices are illustrated in U.S. Pat. Nos. 2,575,921; 3,615,147; 3,679,338; 3,778,209; 4,015,518 and 4,028,024. The prior art devices are, in general, quite complex, costly to construct and difficult to operate. As a result they are frequently limited to use in large scale processing plants where skilled operators and repair personnel are available. Despite a well-recognized consumer preference for freshly-made foods, there is little likelihood that such devices could be economically installed and employed in production of shaped articles at, for example, a restaurant. Furthermore, such prior art devices generally do not permit easy alteration of the size and/or shape of the article to be formed without extensive modifications and changes in machine parts such as extrusion dies, and the like.

BRIEF SUMMARY

The present invention provides extrusion devices that are inexpensively constructed, easily operated, easily maintained and readily modifiable to produce a variety of differently-shaped articles. According to the invention, apparatus is provided for storage and delivery of ingestible materials in a flowable and/or moldable form (e.g., a meat filling and a dough, a pharmaceutical composition and a coating). Such filling and coating materials are delivered respectively to linearly-extending, inner and outer conduits and extruded toward an iris valve element disposed adjacent the terminal portion of the outer conduit. An inner conduit is not linearly coextensive with outer conduit and terminates within the outer conduit at a selected distance from the iris valve.

In operation, the opening and closing of the iris valve shapes the forward and rearward portions of the article. Closing of the iris valve also substantially separates the shaped article from the mass of coating material. The "intermediate" shape of the finished article is determined by a combination of the cross-sectional shape of the outer conduit and the length of time the iris valve remains in an open position. Spherical, ovoid, cylindrical and similarly-shaped articles having one or more fillings may be produced. The quantities of coating and filling materials employed for extrusion of shaped articles are determined by the opening and closing (or starting and stopping) of plural feed mechanisms, the operations of which are synchronized with each other and with operation of the iris valve.

Numerous aspects and advantages of the invention will become apparent upon consideration of the following detailed description of the accompanying drawing wherein:

FIG. 1 is a schematic side elevational view of apparatus of the invention;

FIGS. 2 through 10 provide sequential sectional views of filling and coating materials being shaped in apparatus of the invention with FIGS. 2A through 5A illustrating operation of an iris valve within portions of a sequence;

DETAILED DESCRIPTION

As employed herein, "iris valve" shall mean and include a device capable of reversibly developing a polygonal aperture of smoothly variable horizontal, vertical and/or diagonal dimentions in an otherwise substantially planar surface. As such, the term comprehends devices for developing apertures of regular and irregular plane geometic shapes including, but not limited to, multi-sided polygons approximating a circular shape. An example of such iris valve devices is that commonly employed as a shutter element associated with the circular lens of a camera.

The following description of the invention relates to preparation of shaped articles comprising a single filling material enclosed in a coating material. It should be understood, however, that the invention also provides for formation of shaped articles having plural filling materials.

Figure 1:
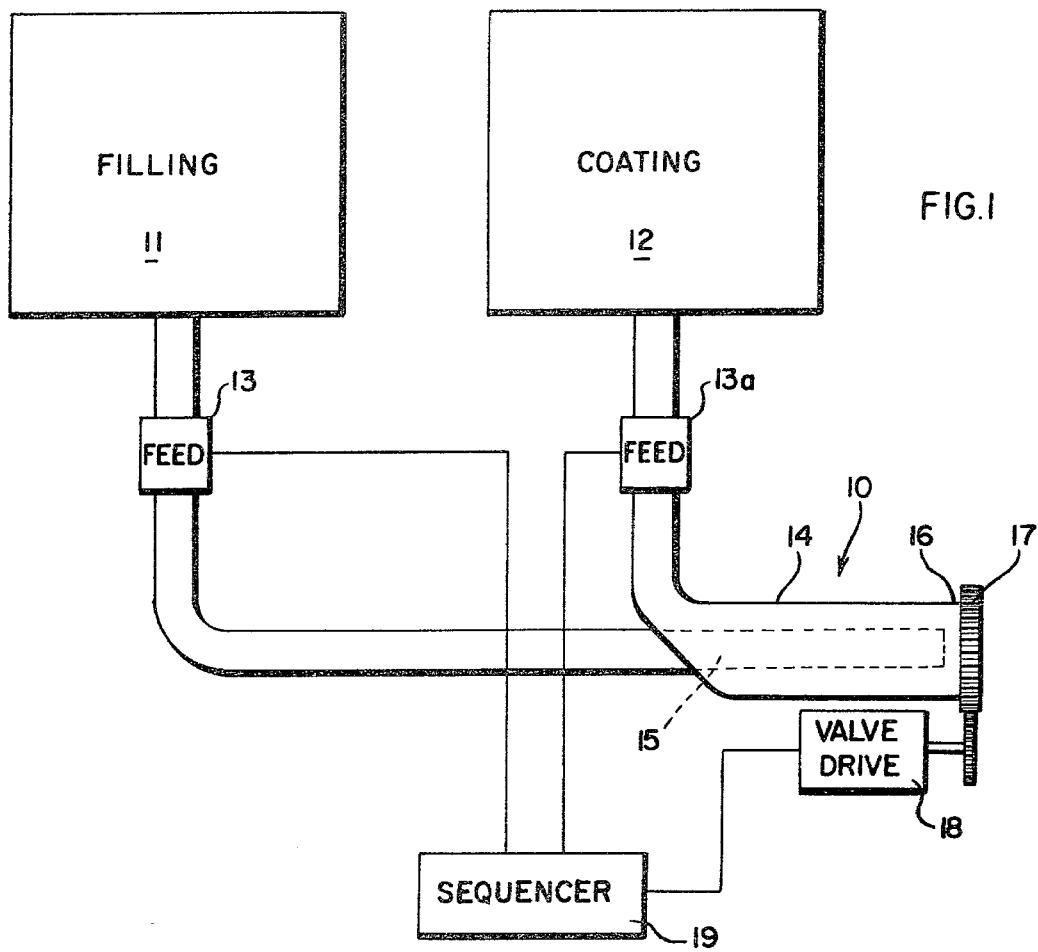

Referring first to the schematic illustration of FIG. 1, extrusion apparatus 10 includes containers 11 and 12 for storage of quantities of filling and coating materials, respectively. Associated with containers 11 and 12 are feed mechanisms 13, 13a, respectively, for supplying coating material to longitudinally-extending outer extrusion nozzle or conduit 14 and filling material to concentric, longitudinally-extending, inner extrusion nozzle or conduit 15. Mounted at terminal portion 16 of outer conduit 14 is iris valve 17 actuated by valve drive element 18. A sequencer 19 functions to coordinate the operation of feed mechanisms 13, 13a and iris valve drive element 18.

Feed mechanisms 13, 13a may be of the same or different type and optionally selected from among a variety of devices available in the art. As one example, one or both of the mechanisms may consist of an enclosed, automatically-driven auger. As another example, one or both feed mechanisms may consist of a means for supplying variable pressures appropriate to the consistency of the materials, to the coating and filling in the containers, combined with, e.g., automatically actuated valve means for regulating the flow of material under pressure.

The cross-sectional shapes of conduits 14 and 15 may be the same or different and the selection of one or more particular shapes for practice of the invention is a matter of choice. In the embodiment of FIGS. 2 through 10, both conduits are circular in cross section. Inner conduit 15 is not linearly coextensive with outer conduit 14 and terminates a selected distance from the iris valve 17 which is mounted at end portion 16 of conduit 14. In a preferred embodiment, inner conduit 15 terminates within conduit 14 at a distance removed from iris valve 17 equal to the distance between the outer surface 15a of conduit 15 and inner surface 14a of conduit 14.

Sequencing apparatus 19 may be of any mechanical, electronic, electrical or electromechanical construction appropriate to the desired sequencing function employed. As one example, apparatus 19 can consist simply of a series of timed switches for actuating an electrical or mechanical drive element 18 and electrical or mechanical feed mechanisms 13, 13a. As another example, sequencing apparatus 19 may consist of electronic control means susceptible to actuation by card or switch means to develop a programmed sequence of operations of the iris valve drive element and the feed apparatus for formation of a particularly sized or shaped article. While sequencing apparatus 19 is illustrated as spatially distinct from drive element 18 and feed apparatus 13, 13a, it will be understood that apparatus 19 may itself consist of a motor "connected" by gears, pulleys, levers or other such energy transmitting elements as would enable opening and closing of valves (including iris valve 17) and the starting and stopping of augers which may comprise feed apparatus 13, 13a.

FIGS. 2A through 5A illustrate the mode of operation of iris valve elements employed in practice of the invention. Valve 17 is therein shown to consist of a plurality of overlapping leaf members 20, the inner edges 21 of which form of polygonal aperture 22 in a plane perpendicular to the longitudinal axis of concentric conduits 14 and 15. By operation of mechanisms well known in the art, leaf members 20 are mounted for movement with respect to each other and about a central axis from a first, closed, position providing an extremely small polygonal aperture 22 (FIG. 5A) to opening positions providing a progressively larger polygonal aperture 22 (FIGS. 4A and 3A). In a closed configuration leaf members 20 occlude conduit 14 while in a fully open configuration (FIG. 2A) they do not. The "opening" procedure is, of course, reversible. The shape of the polygonal aperture to be generated by the valve is a matter of choice and need not necessarily closely approach a circular shape.

FIGS. 2 through 10 illustrate operation of a preferred embodiment of the invention wherein the iris valve 17 is of the variety illustrated in FIGS. 2A through 5A (i.e., providing a circular aperture) and the distance between the end of conduit 14 and leaf members 20 of iris valve 17 is equal to the distance between outer surface 15a of conduit 15 and inner surface 14a of conduit 14.

Operative steps illustrated in FIGS. 2 through 10 will be better understood when considered with reference to the following table which correlates operation of filling feed apparatus 13, coating feed apparatus 13a and iris valve 17. For convenience of description, status of feed apparatus 13 and 13a within the sequence is represented in terms of "opening" and "closing" —terms generally applied to operation of valves. If feed apparatus 13 and 13a took the form of augers, the more appropriate terms might be "starting" and "stopping" or "full speed" and "stopped".

TABLE I

| DRAWING FIG. | STATUS DURING SEQUENCE | | |
|---|---|---|---|
| | FILLING FEED MECHANISM (13) | COATING FEED MECHANISM (13a) | IRIS VALVE (17) |
| 2 | Fully Open | Fully Open | Fully Open (FIG. 2A) |
| 3 | Begins Closing | Fully Open | Begins Closing (FIG. 3A) |
| 4 | Concludes Closing | Begins Closing | Continues Closing (FIG. 4A) |
| 5 | Fully Closed | Fully Closed | Fully Closed (FIG. 5A) |
| 6 | Begins Opening | Begins Opening | Begins Opening |
| 7 | Fully Open | Fully Open | Fully Open |
| 8 | Begins Closing | Fully Open | Begins Closing |
| 9 | Concludes Closing | Begins Closing | Continues Closing |
| 10 | Fully Closed | Fully Closed | Fully Closed |

As shown in FIGS. 2 and 2A, commencement of operation of apparatus 10 is begun with iris valve 17 in a fully open position wherein it does not occlude conduit 14. Coating material 23 is fed by feed mechanism 13a into conduit 14 until the material loads the entire space radially surrounding conduit 15. Filling material 24 is fed by feed apparatus 13 into conduit 15. Coating and filling materials are coextruded continuously at an essentially equal rate.

Simultaneously with the initiation of movement of iris valve leaf members toward a closed position (FIGS. 3, 3A) extrusion of filling material 24 through conduit 15 begins to be discontinued while coating material 23 continues to be extruded through and out of conduit 14.

In FIG. 4, extrusion of filling material 24 is completely discontinued, extrusion of coating material 23 begins to be discontinued, and iris valve 17 continues toward a closed position (FIG. 4A). Put another way, the coating feed mechanism begins to "shut down" immediately upon the complete termination of the action of the filling feed mechanism. In FIG. 5, all extrusion is stopped and iris valve 17 is in fully closed position (FIG. 5A). At this stage coating 23 completely fills the space within conduit 14 surrounding conduit 15 and essentially including the space between the end of conduit 15 and leaf members 20 of iris valve 17. The apparatus 10 is now "loaded" and ready to form shaped articles.

As illustrated in FIG. 6, the production of a shaped article is commenced by the opening of feed mechanisms 13 and 13a to extrude filling and coating materials. Simultaneously, iris valve 17 begins to open and the edge portions 21 of leaf members 20 begin to shape the forward portion 25 of the article. FIG. 7 shows the progress of the article through apparatus 10 at a stage in the sequence wherein a generally hemispherically-shaped forward portion has been formed. Iris valve 17 is completely open with leaf members not occluding conduit 14 at all. Both feed mechanisms 13, 13a are fully open.

To shape the rearward portion 26 of the article, iris valve 17 begins to close while extrusion of coating material 23 continues. Extrusion of filling material 24 is gradually discontinued (FIG. 8). FIG. 9 shows iris valve 17 as it continues to close and shape rearward portion 26 of the article. At this stage, extrusion of filling material 24 is fully discontinued and the continued movement of coating material 23 (now in the process of being discontinued) serves to pull away the filling within the shaped article from the trailing mass of filling material. As shown in FIG. 10, the completed shaped article 27 is formed upon a complete closing of iris valve 17 and complete discontinuation of extrusion. The apparatus is in the same operative condition as shown in FIG. 5 and ready for extrusion of the next shaped article. The finished product 27 may be transported from the apparatus by conventional means such as a conveyor or may simply drop away by gravity from apparatus 10 into a suitable container (not shown).

Figure 11:
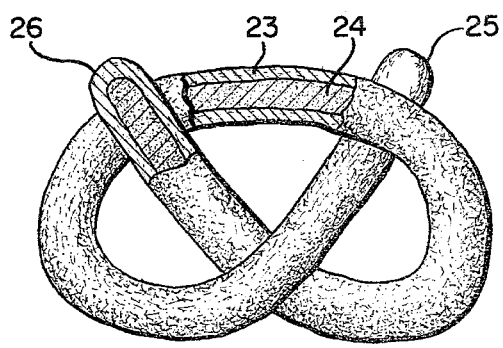
FIG. 11 illustrates a partial sectional view of a shaped article prepared according to the invention.

While FIGS. 6 through 10 illustrate formation of spherical shaped articles, articles having a shape more closely resembling an ovoid shape are as easily prepared by simply allowing iris valve leaf members 20 to remain in fully open position for a short period of time during co-extrusion of coating 23 and filling 24. Put another way, the condition of FIG. 7 is briefly extended in time. Elongated articles such as tamales and the like having rounded end portions are produced by further extending the time during which the iris valve remains in an open position and both coating and filling are extruded. FIG. 11 illustrates an elongated, filled article prepared according to the invention which has been further manipulated to assume the shape of a pretzel.

In the embodiment shown in FIGS. 2 through 10 and employed to manufacture shaped articles of spherical and elongated shapes, a highly desirable general uniformity of thickness of coating materials surrounding the filling material is provided by disposing the end of conduit 15 within conduit 14 at a distance from iris valve 17 equal to the distance separating the inner surface 14a of conduit 14 from the outer surface 15a of conduit 15.

It is most significant to note that in the above-described sequence of operation there is never any substantial pressure exerted against leaf members 20 of iris valve 17. Filling and coating materials are never co-extruded at the same time that the leaf members are in a closed position. This, of course, results in a diminished likelihood that the iris valve will be damaged during operation, even if the leaf members are very thin or the bearing surfaces allowing coordinated motion of the leaf members are in delicate balance.

The above-described preferred embodiment of the invention is seen to provide numerous advantages in manufacture of shaped articles not heretofore available in the art. Apart from its simplicity of assembly of parts and ease of operation, it is noteworthy that the device has the capability of forming a variety of aesthetically pleasing, shaped articles (e.g., spheres, and cylindes with rounded forward and rearward portions) with no substitutions in apparatus parts—simple variations in sequencing of operation are all that is required. This aspect of devices of the invention renders them especially suitable for use in restaurant operations because it allows for immediate preparation of a fresh shaped article in a variety of sizes according to the request of the customer. The same advantages accrue to use of devices of the invention in a large scale, industrial setting. Changes in the length and overall shape of the article can be made in the middle of a continuous high speed production run without the loss or improper shaping of a single article.

Figure 12:
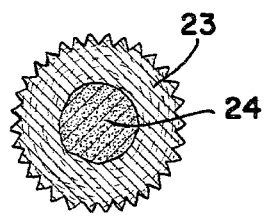
FIGS. 12 and 13 illustrate sectional views of shaped articles prepared according to the invention.
Figure 13:
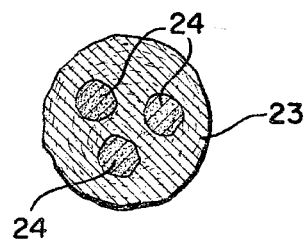

As previously noted, the invention comprehends the use of a variety of cross-sectional shapes for extrusion conduits as well as some degree of variety of polygonal shapes for the aperture formed by the iris valve element. (It will be understood that designing and operating an iris valve having leaf members capable of generating other than approximately a circular shape may constitute a more difficult engineering task in fabrication of components of apparatus of the invention but is nonetheless within the spirit of the invention). In each instance the iris valve will provide for the shaping of a forward coating portion of the filled article in a smoothly expanding form (preferably having a generally circular cross-section) and a rearward portion of the article having the same or similar form. Intermediate portions of the shaped articles will have a shape determined by the cross-sectional shape of the outer conduit and the length of time the iris valve is in a fully open position wherein leaf members do not occlude extrusion of material through the outer conduit. For example, FIG. 12 illustrates, in transverse cross-section, an elongated product prepared through the use of an outer conduit having regularly-spaced detents which give intermediate portions of shaped articles a ribbed surface. In a like manner, FIG. 13 illustrates, in transverse cross-section, an elongated product prepared with apparatus provided with three relatively small diameter conduits for filling material. In such apparatus, inner and outer extrusion conduits would not be concentric but would preferably be axially aligned.

Numerous modifications and variations of the present invention are expected to occur to those skilled in the art upon consideration of the foregoing description of preferred embodiments thereof. As one example, it is expected that a plurality of shaping devices could be supplied with filling and coating materials from a single container for each such material. Consequently, only such limitations as appear in the appended claims should be placed thereon.

What is claimed is:

1. Apparatus for preparation of a shaped article having a forward and rearward portion and wherein a coating material encloses a filling material, said apparatus comprising:
    inner and outer longitudinally-extending extrusion conduits, said outer conduit being of greater length than said inner conduit;
    means for intermittently supplying a coating material to and through said outer conduit;
    means for intermittently supplying a filling material to and through said inner conduit;
    iris valve means adjacent the terminal portion of said outer conduit for smoothly shaping forward and rearward portions of the article, said iris valve means providing leaf closure means reversibly movable from an initial position, wherein they occlude said outer conduit, through intermediate positions wherein they partially occlude said outer conduit to a final position wherein they do not occlude said outer conduit; and,
    means for sequentially activating the operation of said supply means and said iris valve means.

2. The apparatus of claim 1 wherein said inner conduit terminates within said outer conduit at a distance from said iris valve means equal to the distance separating the inner surface of said outer conduit and the outer surface of said inner conduit.

3. The apparatus of claim 1 wherein said inner and outer conduits are geometrically similar.

4. The apparatus of claim 3 wherein said inner and outer conduits are circular in cross section.

5. The apparatus of claim 1 wherein said inner and outer conduits are concentric.

6. The apparatus of claim 1 wherein said iris valve means generates a polygonal aperture approximating a circular shape.

7. The apparatus of claim 1 and including a plurality of inner conduts axially aligned with said outer conduit.

* * * * *